(12) United States Patent
Shah

(10) Patent No.: US 10,606,484 B2
(45) Date of Patent: Mar. 31, 2020

(54) NAND FLASH STORAGE DEVICE WITH NAND BUFFER

(71) Applicant: Google LLC, Mountain View, CA (US)

(72) Inventor: Monish Shah, Dublin, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/816,447

(22) Filed: Nov. 17, 2017

(65) Prior Publication Data

US 2018/0373440 A1 Dec. 27, 2018

Related U.S. Application Data

(60) Provisional application No. 62/524,016, filed on Jun. 23, 2017.

(51) Int. Cl.
*G06F 12/02* (2006.01)
*G06F 12/0804* (2016.01)
*G06F 3/06* (2006.01)
*G06F 12/0868* (2016.01)

(52) U.S. Cl.
CPC .......... *G06F 3/0611* (2013.01); *G06F 3/0635* (2013.01); *G06F 3/0659* (2013.01); *G06F 3/0679* (2013.01); *G06F 12/0246* (2013.01); *G06F 12/0804* (2013.01); *G06F 12/0868* (2013.01); *G06F 2212/214* (2013.01); *G06F 2212/222* (2013.01); *G06F 2212/7203* (2013.01); *G06F 2212/7205* (2013.01)

(58) Field of Classification Search
CPC ................................ G06F 12/00; G06F 12/02
USPC ........................................................ 711/103
See application file for complete search history.

(56) References Cited

U.S. PATENT DOCUMENTS

| 5,930,167 | A | 7/1999 | Lee et al. |
|---|---|---|---|
| 8,301,832 | B1 | 10/2012 | Moore et al. |
| 2011/0145475 | A1 | 6/2011 | Eleftheriou et al. |
| 2011/0258362 | A1* | 10/2011 | McLaren ............ G06F 3/0611 711/5 |
| 2014/0304452 | A1 | 10/2014 | De La Iglesia |

(Continued)

FOREIGN PATENT DOCUMENTS

| WO | 2010071655 A1 | 6/2010 |
|---|---|---|
| WO | 2013048451 A1 | 4/2013 |

OTHER PUBLICATIONS

Kgil, Taeho, et al. "Improving NAND Flash Based Disk Caches" IEEE 35th International Symposium on Computer Architecture, ISCA '08, pp. 327-338, Jun. 21, 2008.

(Continued)

*Primary Examiner* — Gautam Sain
(74) *Attorney, Agent, or Firm* — Lerner, David, Littenberg, Krumholz & Mentlik, LLP

(57) ABSTRACT

At least one aspect is directed to a NAND flash storage device including a plurality of NAND flash chips and a controller. The controller is configured to receive data over an input/output (I/O) bus and write the received data to a first NAND flash chip of the plurality of NAND flash chips and a second NAND flash chip of the plurality of NAND flash chips. The write operations to each NAND flash chip do not overlap in time. The controller is configured to read data from whichever of the first NAND flash chip or the second NAND flash chip is not currently executing a write operation such that read operations are not queued behind write operations.

16 Claims, 9 Drawing Sheets

(56) References Cited

U.S. PATENT DOCUMENTS

| | | | |
|---|---|---|---|
| 2015/0149692 A1* | 5/2015 | Wang | G06F 12/0253 |
| | | | 711/103 |
| 2015/0324125 A1* | 11/2015 | Li | G06F 3/0631 |
| | | | 711/103 |
| 2016/0179422 A1 | 6/2016 | Lee | |
| 2017/0068456 A1* | 3/2017 | Toge | G06F 3/0605 |
| 2017/0131908 A1 | 5/2017 | Shah | |
| 2018/0260136 A1* | 9/2018 | Huo | G06F 3/0611 |

OTHER PUBLICATIONS

Kim, Jonghwa, et al. "Deduplication in SSDs: Model and Quantitative Analysis" IEEE 28th Symposium on Mass Storage Systems and Technologies (MSST), pp. 1-12, Apr. 16, 2012).
International Search Report and Written Opinion dated Jun. 22, 2018in International (PCT) Application No. PCT/US2018/022683.
Extended European Search Report dated Jun. 22, 2018 in European Patent Application No. 18169162.7.
Combined Search and Examination Report dated Oct. 8, 2018 in United Kingdom Patent Application No. 1804693.8 (6 pages).
Office Action dated Mar. 29, 2019 in Taiwanese Patent Application No. 107111866, and English translation thereof.

\* cited by examiner

NAND FLASH STORAGE DEVICE WITH NAND BUFFER

RELATED APPLICATIONS

The present application claims the benefit of and priority to U.S. Provisional Patent Application No. 62/524,016, titled "NAND FLASH STORAGE DEVICE WITH NAND BUFFER," and filed on Jun. 23, 2017, the entire contents of which are hereby incorporated by reference.

BACKGROUND

Storage devices based on NAND flash have good average latency; however, the worst-case latency, referred to as "tail latency" can be much longer. Providing more predictable latency in a NAND flash storage device may be beneficial in some applications of NAND flash technology; for example, in NAND flash-based storage devices and swap devices. A swap device can serve as extended memory space, sometimes referred to as swap space, in a computing system. The swap device can represent a tradeoff between the faster speed of RAM and the lower cost of alternative memory/storage mediums such as a hard disk drive (HDD) or a solid state drive (SSD). An SSD based on NAND flash, while faster than an HDD, may suffer from unpredictable tail latency due to the way NAND flash chips operate.

SUMMARY

At least one aspect is directed to a NAND flash storage device. The NAND flash storage device includes a plurality of NAND flash chips and a controller. The controller is configured to receive data over an input/output (I/O) bus. The controller is configured to write the received data to a first NAND flash chip of the plurality of NAND flash chips and a second NAND flash chip of the plurality of NAND flash chips successively such that write operations to each NAND flash chip do not overlap in time. The controller is configured to receive a read command over the I/O bus. The controller is configured to, responsive to receiving the read command, read data from whichever of the first NAND flash chip or the second NAND flash chip is not currently executing a write operation such that read operations are not queued behind write operations.

In some implementations, the controller can be further configured to designate the first NAND flash chip as a secondary write chip, the second NAND flash chip as a future secondary write chip, a third NAND flash chip as a primary write chip, a fourth NAND flash chip as a future primary write chip, and any remaining NAND flash chips as read-only. The controller can be configured to write the received data to the primary write chip and the secondary write chip successively such that write operations to each chip do not overlap in time. The controller can be configured to copy valid data from the future primary write chip to the future secondary write chip. The controller can be configured to, following the writing of the received data and the copying of the valid data, designate the first NAND flash chip as read-only, the second NAND flash chip as the secondary write chip, the third NAND flash chip as the future secondary write chip, and the fourth NAND flash chip as the primary write chip.

In some implementations, the controller can be further configured to, following the writing of the received data and the copying of the valid data, designate a fifth NAND flash chip as the future primary write chip. The controller can be configured to write second data received over the I/O bus to the primary write chip and the secondary write chip successively such that write operations to each chip do not overlap in time. The controller can be configured to copy second valid data from the future primary write chip to the future secondary write chip. The controller can be configured to, following the writing of the second received data and the copying of the second valid data, designate the second NAND flash chip as read-only, the third NAND flash chip as the secondary write chip, the fourth NAND flash chip as the future secondary write chip, and the fifth NAND flash chip as the primary write chip.

In some implementations, the copy operation can include copying the valid data from the future primary write chip to the future secondary write chip such that the valid data and the free space, respectively, occupy substantially contiguous respective memory spaces of the future secondary write chip. The copying operation can include copying the valid data from the future secondary write chip back to the future primary write chip such that the valid data and the free space, respectively, occupy substantially contiguous respective memory spaces of the future primary write chip. The copying operation can include erasing the memory spaces of the future primary write chip and the future secondary write chip occupied by the free space.

In some implementations, the write operation and the copy operation are performed during overlapping time periods At least one aspect is directed to a NAND flash storage device. The NAND flash storage device includes a plurality of buffer NAND flash chips, a plurality of storage NAND flash chips, and a controller. The controller is configured to receive incoming data over an input/output (I/O) bus. The controller is configured to write the received incoming data to a first buffer NAND flash chip of the plurality of storage NAND flash chips and a first storage NAND flash chip of the plurality of buffer NAND flash chips successively such that write operations to each NAND flash chip do not overlap in time. The controller is configured to receive a read command over the I/O bus. The controller is configured to, responsive to receiving the read command, read data from whichever of the first buffer NAND flash chip or the first storage NAND flash chip is not currently executing a write operation such that read operations are not queued behind write operations.

In some implementations, the controller can be configured to designate the first storage NAND flash chip as a primary write chip, a second storage NAND flash chip as a future primary write chip, the first buffer NAND flash chip as a secondary write chip, a second buffer NAND flash chip as a future secondary write chip, and any remaining NAND flash chips as read-only. The controller can be configured to write the received data to the primary write chip and the secondary write chip successively such that write operations to each chip do not overlap in time. The controller can be configured to copy valid data from the future primary write chip to the future secondary write chip. The controller can be configured to following the writing of the received data and the copying of the valid data, designate the first storage NAND flash chip as read-only, the second storage NAND flash chip as the primary write chip, the first buffer NAND flash chip as the future secondary write chip, and the second buffer NAND flash chip as the secondary write chip.

In some implementations, the controller can be configured to, following the writing of the received data and the copying of the valid data, designate a third storage NAND flash chip as the future primary write chip. The controller can be configured to write second data received over the I/O bus to the primary write chip and the secondary write chip successively such that write operations to each chip do not overlap in time. The controller can be configured to copy second valid data from the future primary write chip to the future secondary write chip. The controller can be configured to, following the writing of the second received data and the copying of the second valid data, designate the second storage NAND flash chip as read-only, the third storage NAND flash chip as the primary write chip, the first buffer NAND flash chip as the secondary write chip, and the second buffer NAND flash chip as the future secondary write chip.

In some implementations, the copy operation can include copying the valid data from the future primary write chip to the future secondary write chip such that the valid data and the free space, respectively, occupy substantially contiguous respective memory spaces of the future secondary write chip. The copy operation can include copying the valid data from the future secondary write chip back to the future primary write chip such that the valid data and the free space, respectively, occupy substantially contiguous respective memory spaces of the future primary write chip; and erasing the memory spaces of the future primary write chip and the future secondary write chip occupied by the free space.

In some implementations, the buffer NAND flash chips can be single-level cell (SLC) NAND flash chips, and the storage NAND flash chips can be triple-level cell (TLC) NAND flash chips.

At least one aspect is directed to method of buffering a NAND flash storage device. The method includes receiving data over an input/output (I/O) bus. The method includes writing the received data to a first NAND flash chip of the plurality of NAND flash chips and a second NAND flash chip of the plurality of NAND flash chips successively such that write operations to each NAND flash chip do not overlap in time. The method includes receiving a read command over the I/O bus. The method includes, responsive to receiving the read command, reading data from whichever of the first NAND flash chip or the second NAND flash chip is not currently executing a write operation such that read operations are not queued behind write operations In some implementations, the method can include designating the first NAND flash chip as a secondary write chip, the second NAND flash chip as a future secondary write chip, a third NAND flash chip as a primary write chip, a fourth NAND flash chip as a future primary write chip, and any remaining NAND flash chips as read-only. The method can include writing the received data to the primary write chip and the secondary write chip successively such that write operations to each chip do not overlap in time. The method can include copying valid data from the future primary write chip to the future secondary write chip. The method can include, following the writing of the received data and the copying of the valid data, designating the first NAND flash chip as read-only, the second NAND flash chip as the secondary write chip, the third NAND flash chip as the future secondary write chip, and the fourth NAND flash chip as the primary write chip.

In some implementations, the method can include, following the writing of the received data and the copying of the valid data, designating a fifth NAND flash chip as the future primary write chip. The method can include writing second data received over the I/O bus to the primary write chip and the secondary write chip successively such that write operations to each chip do not overlap in time. The method can include copying second valid data from the future primary write chip to the future secondary write chip. The method can include, following the writing of the second received data and the copying of the second valid data, designating the second NAND flash chip as read-only, the third NAND flash chip as the secondary write chip, the fourth NAND flash chip as the future secondary write chip, and the fifth NAND flash chip as the primary write chip.

In some implementations, the copy operation can include copying the valid data from the future primary write chip to the future secondary write chip such that the valid data and the free space, respectively, occupy substantially contiguous respective memory spaces of the future secondary write chip. The copy operation can include copying the valid data from the future secondary write chip back to the future primary write chip such that the valid data and the free space, respectively, occupy substantially contiguous respective memory spaces of the future primary write chip. The copy operation can include erasing the memory spaces of the future primary write chip and the future secondary write chip occupied by the free space.

In some implementations, the writing operation and the copying operation are performed during overlapping time periods.

At least one aspect is directed to method of buffering a NAND flash storage device. The method includes receiving data over an input/output (I/O) bus. The method includes writing the received incoming data to a first buffer NAND flash chip of the plurality of storage NAND flash chips and a first storage NAND flash chip of the plurality of buffer NAND flash chips successively such that write operations to each NAND flash chip do not overlap in time. The method includes receiving a read command over the I/O bus. The method includes, responsive to receiving the read command, reading data from whichever of the first buffer NAND flash chip or the first storage NAND flash chip is not currently executing a write operation such that read operations are not queued behind write operations.

In some implementations, the method includes designating the first storage NAND flash chip as a primary write chip, a second storage NAND flash chip as a future primary write chip, the first buffer NAND flash chip as a secondary write chip, a second buffer NAND flash chip as a future secondary write chip, and any remaining NAND flash chips as read-only. The method includes writing the received data to the primary write chip and the secondary write chip successively such that write operations to each chip do not overlap in time. The method includes copying valid data from the future primary write chip to the future secondary write chip. The method includes following the writing of the received data and the copying of the valid data, designating the first storage NAND flash chip as read-only, the second storage NAND flash chip as the primary write chip, the first buffer NAND flash chip as the future secondary write chip, and the second buffer NAND flash chip as the secondary write chip.

In some implementations, the method includes, following the writing of the received data and the copying of the valid data, designating a third storage NAND flash chip as the future primary write chip. The method includes writing second data received over the I/O bus to the primary write chip and the secondary write chip successively such that write operations to each chip do not overlap in time. The method includes copying second valid data from the future primary write chip to the future secondary write chip. The method includes, following the writing of the second received data and the copying of the second valid data, designating the second storage NAND flash chip as read-only, the third storage NAND flash chip as the primary write chip, the first buffer NAND flash chip as the secondary write chip, and the second buffer NAND flash chip as the future secondary write chip.

In some implementations, the method includes copying the valid data from the future primary write chip to the future secondary write chip such that the valid data and the free space, respectively, occupy substantially contiguous respective memory spaces of the future secondary write chip. The method includes copying the valid data from the future secondary write chip back to the future primary write chip such that the valid data and the free space, respectively, occupy substantially contiguous respective memory spaces of the future primary write chip. The method includes erasing the memory spaces of the future primary write chip and the future secondary write chip occupied by the free space.

In some implementations, the buffer NAND flash chips can be single-level cell (SLC) NAND flash chips, and the storage NAND flash chips can be triple-level cell (TLC) NAND flash chips.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
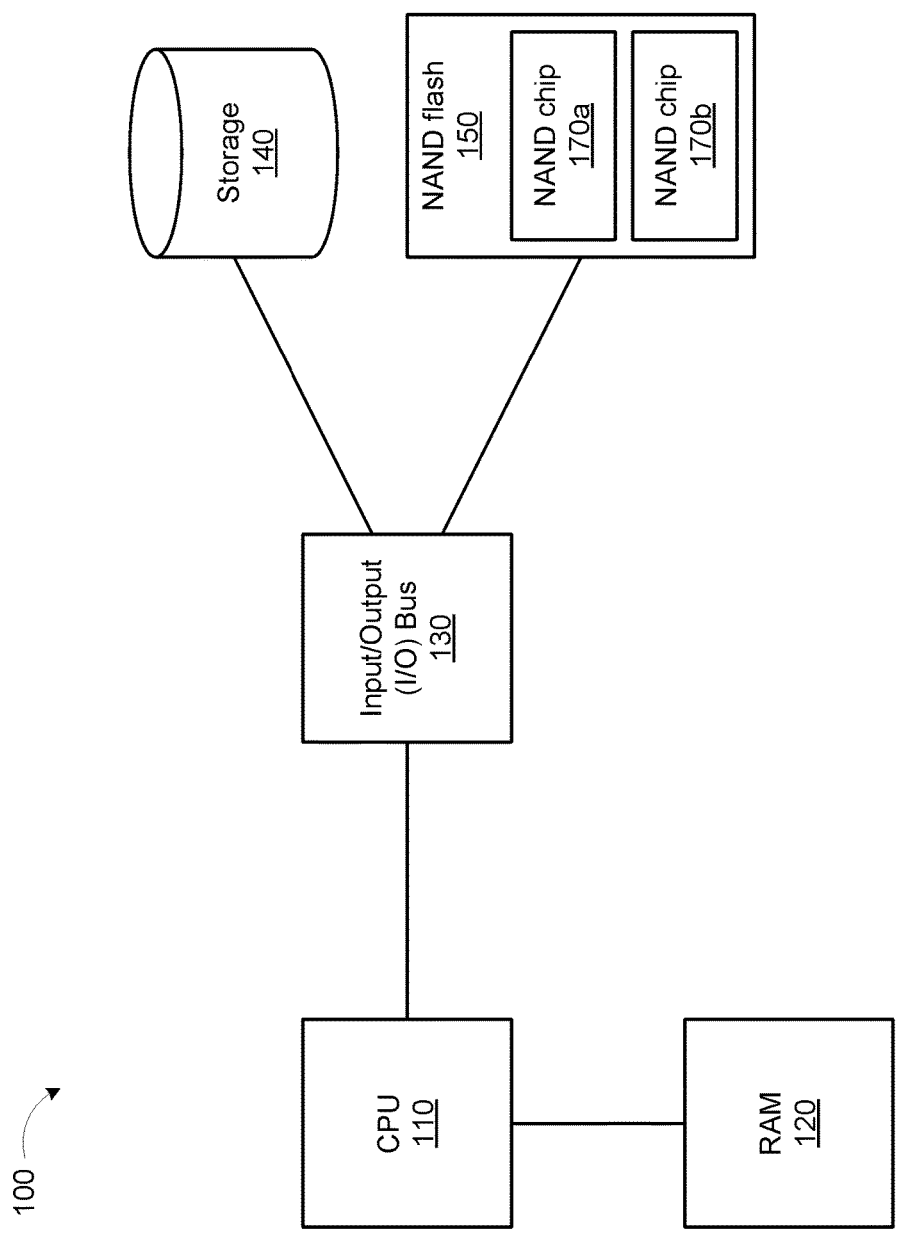
FIG. 1 is block diagram of an example computer system including a NAND flash storage device with a NAND buffer, according to an illustrative implementation.

Following below are descriptions of various concepts related to, and implementations of, a predictable-latency NAND flash storage device with NAND buffer and methods of using the same. The various concepts introduced above and discussed in greater detail below may be implemented in any of numerous ways, as the described concepts are not limited to any particular manner of implementation. Examples of specific implementations and applications are provided primarily for illustrative purposes.

This disclosure generally relates to a predictable-latency NAND flash storage device with a NAND buffer. The storage device can be a solid-state drive (SSD) or a swap device. A swap device is a secondary storage device that can function as an extension of Random Access Memory (RAM). When the amount of data to be retained in memory exceeds the capacity of RAM, some of the data can be moved to the swap device in an operation sometimes referred to as "paging." Traditionally, the secondary device could be a hard disk drive (HDD). Reading and writing data from an HDD is very slow relative to RAM, however, making an HDD impractical as a swap device in settings where retrieval speed is important. More recent SSDs, particularly NAND flash-based SSDs, although still slower than RAM, exhibit faster retrieval times relative to HDDs. NAND SSDs also tend to be less expensive than RAM, thus reducing RAM capacity in favor of SSD capacity can lead to cost savings. More recently developed low-latency NAND (LLNAND), such as Samsung's Z-NAND, are designed with special circuitry that improves its typical read latency. LLNAND-based SSDs are even faster, and thus practical for paging and other temporary data storage in some server applications.

NAND flash SSDs have other drawbacks, however. While NAND read time is very fast, on the order of 10s of microseconds, erase and write operations are much slower, on the order of milliseconds each. And, because a NAND flash chip cannot execute a read operation and write operation at the same time, a read operation queued behind an erase/write operation can exhibit a latency increase of two or three orders of magnitude from normal. This is called "tail latency." While it is possible to buffer data in RAM for writing to a NAND flash chip, the overhead can be cost prohibitive. For example, a device having ten NAND flash chips will require RAM equivalent to one tenth of the total NAND capacity as a buffer. Because DRAM can be four times as expensive as NAND storage, the cost overhead may be 40%.

This disclosure therefore proposes employing a NAND buffer to improve tail latency at a lower cost overhead than that of a RAM buffer. The system works by writing each page of data into two chips in sequence: first into a first chip, and then into a second chip. The second chip may be considered a NAND buffer. The write operations do not overlap in time. Read operations can be executed by the chip that is presently not executing a write operation. Thus, the read operations need not be queued behind write operations, allowing the NAND flash storage device to have more predictable latency.

In some implementations, the first chip (and, by extension, the second chip) are filled, and two new chips are chosen as write buffers. The first chip can be switched to read only and, because the first chip can perform read operations without interruptions from write operations, the copy of the data stored on the second chip is no longer necessary. The second chip is now free for future primary write operations. Two new chips, a third chip and a fourth chip, can be selected for writing. In this case, the fourth chip may be considered a NAND buffer.

For such a system to work, it is helpful for the two new chips selected for writing to contain duplicate data. Accordingly, prior to receiving new data, existing data on the third chip can first be copied to the fourth chip. The copying operation involves "garbage collection," an operation memory devices perform to free up space occupied by data that has been invalidated (is no longer in use). Garbage collection can be time consuming and, like erase/write operations, can prevent read operations from executing until it is complete. Therefore, the garbage collection and copying operations are executed such that initially, only the fourth chip is being written and third chip is available for reading. Later, the garbage collected version is copied back from the fourth chip to the third chip such that the fourth chip is available for reading. Further, the garbage collection and copy operations between third and fourth chip are overlapped in time with writing into the first and second chip. As long as the garbage collection and copy operation takes less time than the writing operations, the third and fourth chips will be ready to take over execution of write operations when the first and second chips are filled. A new pair of chips will then be selected for garbage collection and copy operation.

In such a system, at any given time, two buffer chips contain a duplicate of the data in two other chips. Accordingly, a device having ten NAND flash chips for storage can have two additional NAND flash buffer chips. The cost overhead will thus be 20%, which can be half the cost overhead of using a DRAM buffer.

Additional buffer NAND flash chips can be employed to improve the write bandwidth of the NAND flash storage device. The write bandwidth of a NAND flash storage device refers to the amount of data the NAND flash storage device can receive and store in a given amount of time. In some cases, the write bandwidth of a NAND flash storage device can be limited by the time it takes to write data to a particular NAND flash chip. Therefore, write bandwidth can be increased by adding more buffer NAND flash chips, and distributing the write operations among them. Accordingly, in some implementations, the NAND flash storage device can include additional buffer chips (i.e., 4, 6, 8, or more) to improve the write bandwidth.

In some implementation, the NAND flash storage device can employ wear leveling. A NAND flash chip can only perform a finite number of write operations before exhibiting excessive bit errors. Eventually, after performing many write operations, the NAND flash chip will wear out and begin to fail. To prolong the life of the NAND flash storage device, the NAND flash storage device can rotate which NAND flash chips are designated as buffer chips for write operations. The designation can be rotated to equalize or substantially equalize wear among some or all of the NAND flash chips in the device, as opposed to concentrating buffering write operations on a small number of chips. In this manner, the wear can be spread, or "leveled," across many NAND flash chips of the device.

FIG. 1 is block diagram of an example computer system 100 including a NAND flash storage device with a NAND buffer, according to an illustrative implementation. The system 100 can be a computing device; for example and without limitation, a personal computing device such as a laptop or desktop computer, a shared computing device such as a server or mainframe, or component of the aforementioned or other computing device. The system 100 includes a processor such as a central processing unit (CPU) 110, RAM 120 such as DRAM, an input/output (I/O) bus 130 such as a Peripheral Component Interconnect Express (PCIe), a data storage device 140 such as a hard disk drive (HDD) or a solid-state drive (SSD) for long-term data storage, and a NAND flash storage device 150. The RAM 120 may be a main memory and can be directly accessible to the CPU 110 over, for example, an address bus that carries a memory address of the desired location, and a data bus used to read or write data from/to the specified memory address.

In some implementations, the NAND flash storage device 150 can be a swap device providing a swap space to the system 100. In some computing environments, the kernel or operating system can employ a memory/storage abstraction such as virtual memory, which provides applications executing on the CPU 110 with transparent and consistent access to one or more memory devices that can vary in type and location. For example, virtual memory can allow applications executing on the CPU 110 to access an extended memory space. The extended memory space can exceed the capacity of the RAM 120. When the data sought to be stored in memory exceed the capacity of the RAM 120, the virtual memory function can perform paging, by which the system 100 can store data in a secondary memory device such as an HDD or a SSD. This extended memory space can be referred to as swap space, and the storage device providing the swap space can be referred to as a swap device.

Different types of memory and storage devices can vary greatly in access speed, with RAM generally being much faster than HDDs, and NAND flash falling in the middle. The slow access times of HDDs make them impractical for applications requiring fast access to data. NAND flash storage devices are much faster than HDDs, and thus become useful for a wider range of applications. NAND flash storage devices have the additional advantage of being less expensive than some common types of RAM such as DRAM. Newer types of NAND such as low-latency NAND (LLNAND) can be even faster, exhibiting latency for read operations of approximately 10 μs versus approximately 70 μs regular NAND. LLNANDs also exhibit less latency for program (write) operations; i.e., 100-200 μs versus a few milliseconds for regular NAND. A write operation, however, generally involves both a program operation and an erase operation. LLNANDs may still suffer from slow erase times, which can take on the order of 5 ms. As an additional challenge, a NAND flash chip or die can generally only perform one operation at a time. For example, if a NAND flash chip is executing an erase/program sequence of a write operation, any incoming read commands will be queued until completion. Thus, some read operations may require up to several milliseconds to complete despite a nominal latency of tens of microseconds. These outlier latencies are referred to as "tail latency." Both the duration and the unpredictability of this tail latency can present difficulties when using NAND flash. Some systems can use a RAM to cache the contents of a NAND flash chip being written to such that the RAM can perform the read operation while the NAND flash chip executes write operations—see, for example, U.S. patent application Ser. No. 14/936,486. Because RAM can be more expensive that NAND flash, however, the RAM adds a cost overhead that can be unacceptable for some applications. Therefore, this disclosure proposes providing one or more additional NAND flash chips to provide a cache for data residing in NAND flash chips executing write operations. A NAND flash-based buffer is described in more detail below with regard to FIG. 2.

Figure 2:
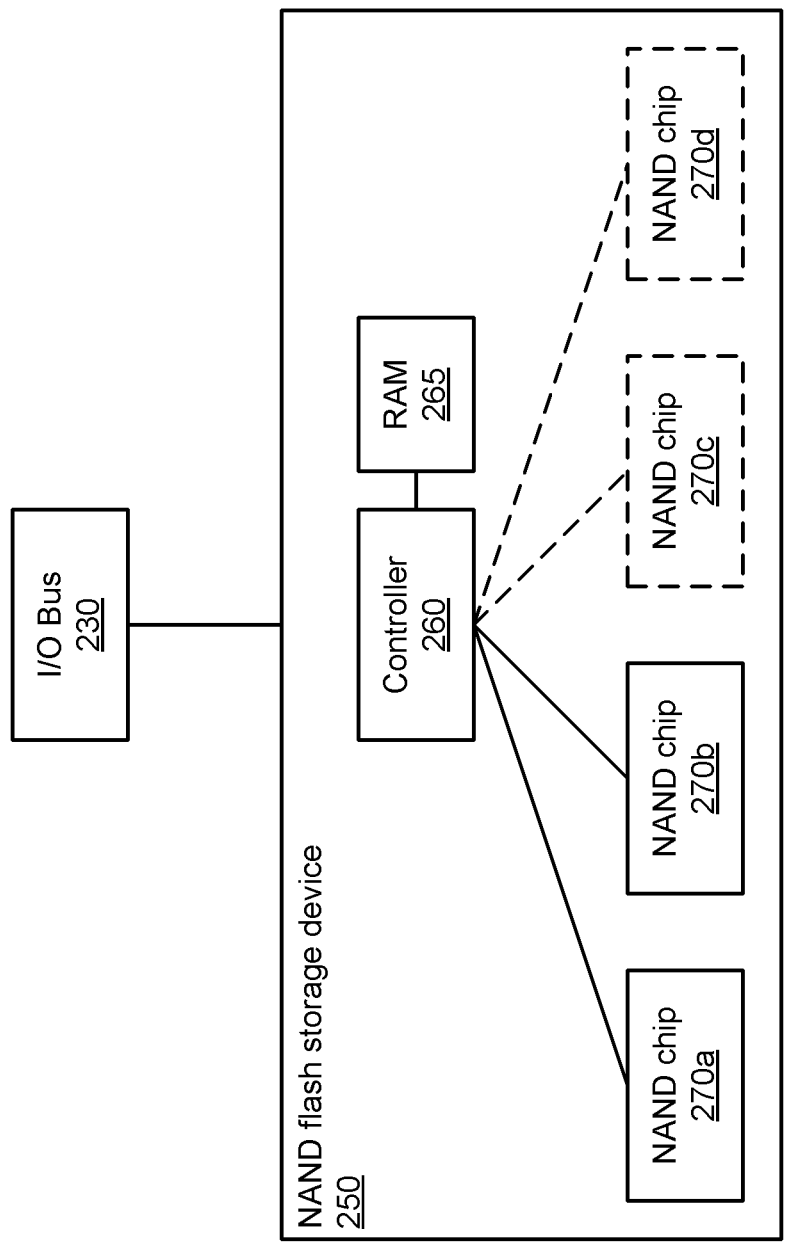
FIG. 2 is a block diagram of an example NAND flash storage device with a NAND buffer, according to an illustrative implementation.

FIG. 2 is a block diagram of an example NAND flash storage device 250 with a NAND buffer, according to an illustrative implementation. The NAND flash storage device 250 can serve as the NAND flash storage device 150. To avoid tail latency associated with read operations being queued behind write operations, the NAND flash storage device 250 can employ double buffering using two NAND flash chips 270a and 270b (collectively, "NAND flash chips 270"). A controller 260 can handle storage access commands received over the I/O bus 230. The controller 260 can include programmable logic such as an application-specific integrated circuit (ASIC), a field-programmable gate array (FPGA), a microcontroller, or a microprocessor. The controller 260 can be integral with, or external to the NAND flash storage device 250. The controller 260 can orchestrate read and write operations of the NAND flash storage device 250 such that the CPU 110 need not be aware of, or itself execute, the buffering operations of the NAND flash storage device 250. Alternatively, it is possible to design a simpler controller that relies on the CPU 110 to orchestrate the operations, while the controller performs the lower level work of completing each operation. Accordingly, the controller 260 is configured to receive data and/or commands over the I/O bus 230, and write the received data first to one of the NAND flash chips 270, and then to a second of the NAND flash chips 270. The controller 260 executes the write operations successively—either autonomously or under the direction of CPU 110—such that they do not overlap in time; thus, at any given time, the NAND flash chip 270 that is not presently performing a write operation can promptly perform read operations. Once the controller 260 executes each write operation, two of the NAND flash chips 270 can contain the same data. The controller 260 can execute read commands by reading from whichever of the first NAND flash chip or the second NAND flash chip is not currently executing a write operation such that read operations are not queued behind write operations. In this manner, tail latency can be improved.

In some implementations, the NAND flash storage device 250 can include additional NAND flash chips 270c and 270d to further improve write bandwidth. For example, a NAND flash storage device 250 having four NAND flash chips 270a through 270d can split write operations between two NAND flash chips 270; e.g., NAND flash chips 270a and 270b. After the NAND flash chips 270a and 270b complete their respective write operations, those write operations can be repeated on the NAND flash chips 270c and 270d. In this manner, the write bandwidth of the NAND flash storage device 250 can be approximately doubled. The NAND flash storage device 250 can employ additional NAND flash chips 270 for further increases in write bandwidth.

In some implementations, the NAND device 250 can include some RAM 265 to serve as a cache or buffer to store data while it is written to each NAND flash chip 270. This RAM 265 need not have the capacity to buffer the entire contents of a NAND flash chip 270, but rather can be only large enough to buffer a single block or page of data. Accordingly, it can be much smaller than a dedicated RAM buffer, and thus not contribute appreciably to the cost overhead of the NAND device 250.

Figure 3:
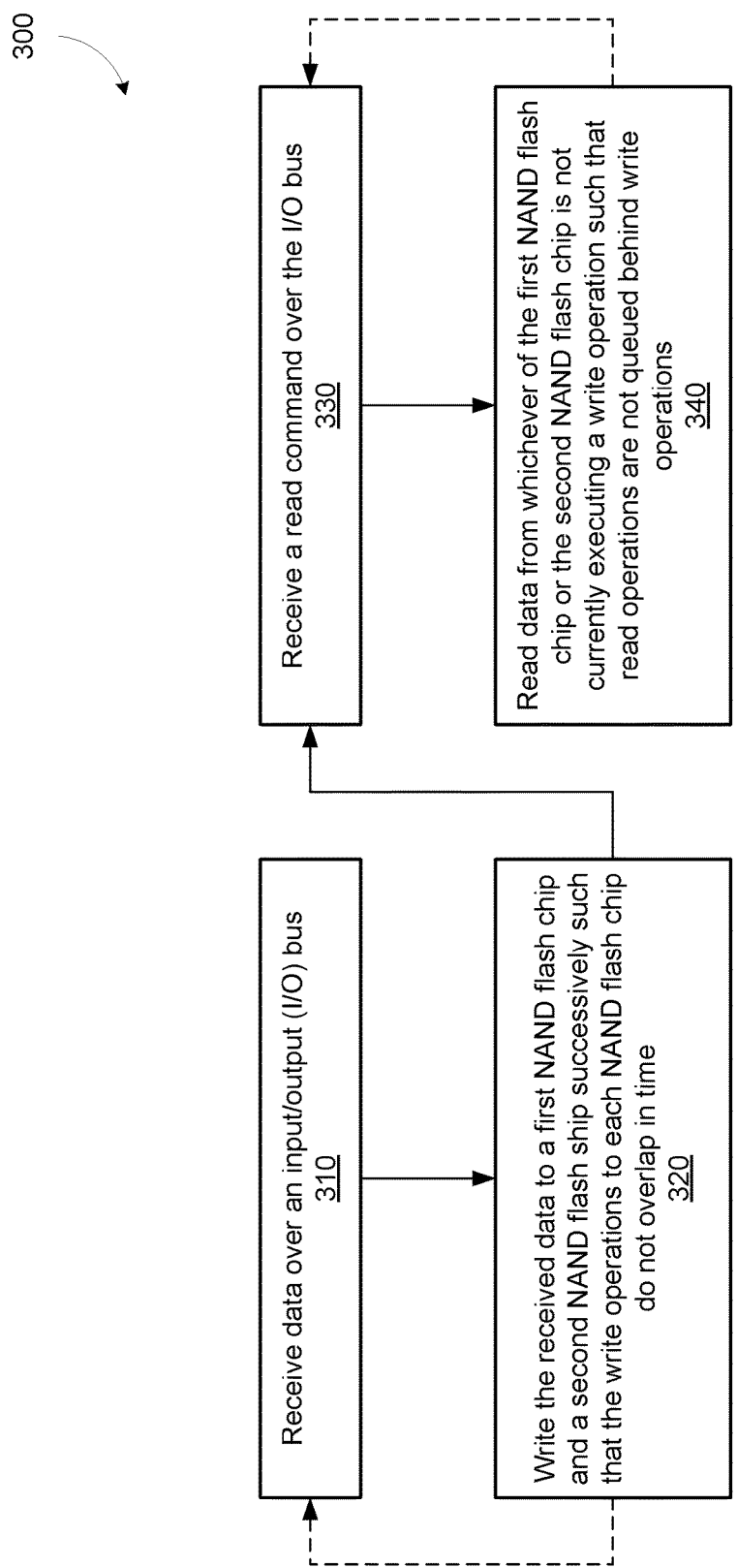
FIG. 3 is a flowchart showing an example method of using a NAND flash storage device with a NAND buffer, according to an illustrative implementation.

FIG. 3 is a flowchart showing an example method 300 of using a NAND flash storage device with a NAND buffer, according to illustrative implementations. The NAND flash storage device can include any of the NAND flash storage devices 150, 250, 450, or 750 described herein. The method 300 includes receiving data over an input/output (I/O) bus (stage 310). The method 300 includes writing the received data to a first NAND flash chip and a second NAND flash chip successively such that the write operations to each NAND flash chip do not overlap in time (stage 320). The method includes receiving a read command over the I/O bus (stage 330). The method 300 includes reading data from whichever of the first NAND flash chip or the second NAND flash chip is not currently executing a write operation such that read operations are not queued behind write operations (stage 340).

The method 300 includes receiving data over an I/O bus (stage 310). The NAND flash storage device can receive a write command over the I/O bus, such as one of the I/O busses 130 or 230 previously described with respect to the NAND flash storage devices 150 or 250, respectively. The write command can include data to be stored by the NAND flash storage device.

The method 300 includes writing the received data to a first NAND flash chip and a second NAND flash chip successively such that the write operations to each NAND flash chip do not overlap in time (stage 320). The write operations can be executed by a controller of the NAND flash storage device, such as the CPU 110 or the controller 260 previously described. The controller can execute the write operation on one of two NAND flash chips, such as the NAND flash chip 270a or 270b. While the controller executes a write operation on one of the NAND flash chips 270, that particular NAND flash chip will not be able to process other operations. Accordingly, the controller will execute the write operations on the two NAND flash chips successively such that they do not overlap in time. In some implementations, the receiving stage 310 and the writing stage 320 can be repeated until the first and second NAND flash chips are full or substantially full. In some implementations, the NAND flash chips are low-latency NAND (LLNAND) chips.

The method includes receiving a read command over the I/O bus (stage 330). The method 300 includes reading data from whichever of the first NAND flash chip or the second NAND flash chip is not currently executing a write operation such that read operations are not queued behind write operations (stage 340). During execution of the write operations, the NAND flash storage device may receive a read command over the I/O bus. The controller can direct the read command to whichever of the NAND flash chips is not currently executing a write operation. In this manner, stages 330 and 340 can proceed concurrently with stages 310 and 320, and read operations can be processed promptly without being queued behind slower write operations. The stages of the method 300 can repeat as additional data and read commands are received over the I/O bus. In some implementations, the role played by each particular NAND flash chip can cycle, with different NAND flash chips performing different buffer and storage functions at different times. Examples of different manners of NAND flash chip buffering and storage are described below with reference to FIGS. 4 through 9.

Figure 4:
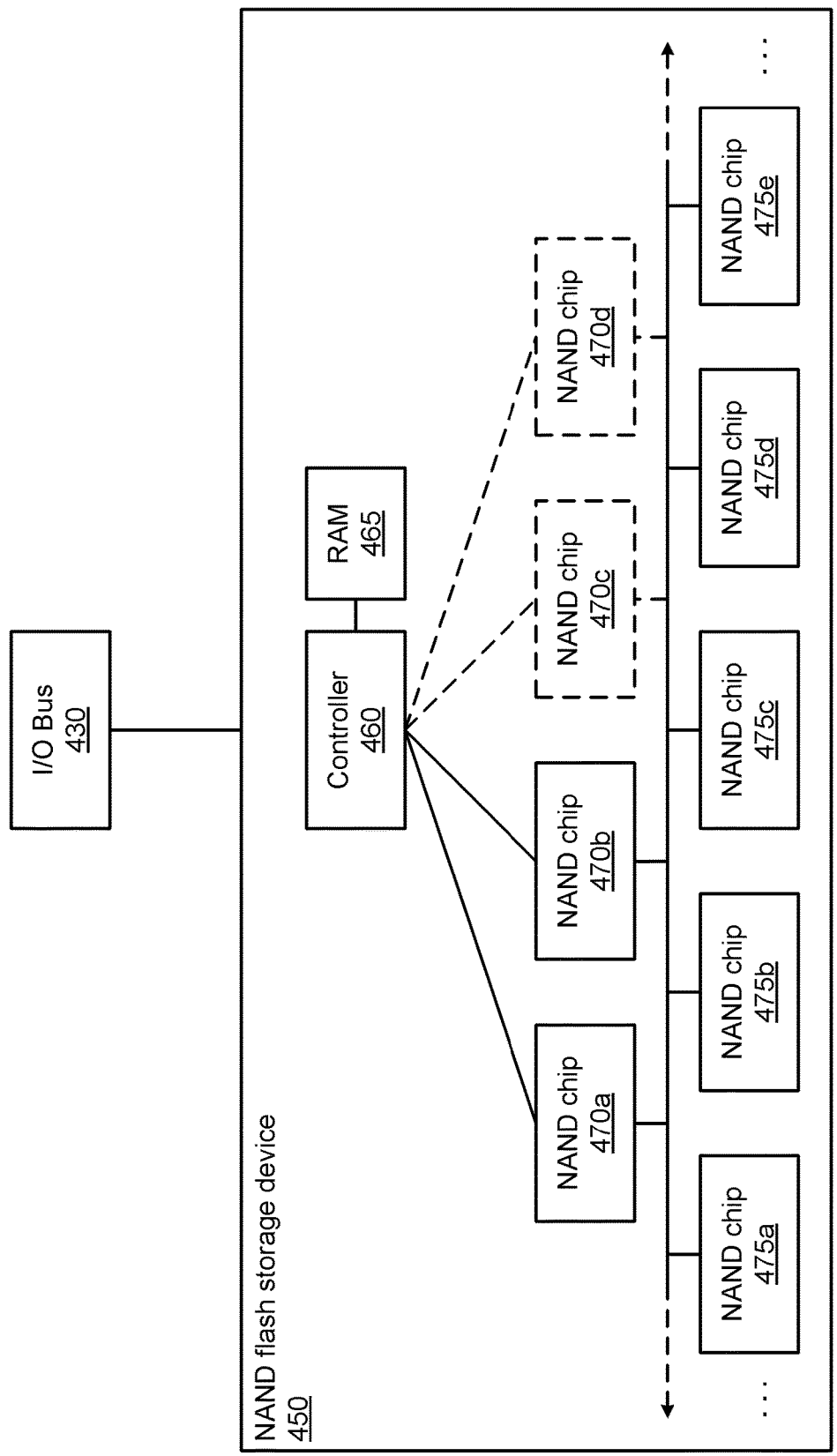
FIG. 4 is a block diagram of an example NAND flash storage device with a NAND buffer and additional NAND storage, according to an illustrative implementation.

FIG. 4 is a block diagram of an example NAND flash storage device 450 with a NAND buffer and additional NAND storage, according to illustrative implementations. The NAND flash storage device 450 includes a controller 460 for executing read and write commands received over the I/O bus 430. The controller 460 can include RAM 465, or be in communication with the RAM 465 via a memory bus. The controller 460 can include programmable logic such as an application-specific integrated circuit (ASIC), a field-programmable gate array (FPGA), a microcontroller, or a microprocessor. The controller 460 can be integral with, or external to the NAND flash storage device 450. The NAND flash storage device 450 can include two buffer NAND flash chips 470a and 470b (collectively, "buffer NAND flash chips 470"). In some implementations, the NAND flash storage device 450 can include additional buffer NAND flash chips 470, as described further below. In some implementations, the NAND flash storage device 450 can use the RAM 465 for buffering data received over the I/O bus 430 while it is being written to one or more of the buffer NAND flash chips 470. The NAND flash storage device 450 also includes storage NAND flash chips 475a through 475e (collectively, "storage NAND flash chips 475") that provide additional memory capacity over that of the buffer NAND flash chips 470. Data received over the I/O bus 430 can be buffered in the buffer NAND flash chips 470 before being copied to one of the storage NAND flash chips 475.

In some implementations, the buffer NAND flash chips 470 can be single level cell (SLC) NAND flash chips or low-latency NAND (LLNAND) flash chips while the storage NAND flash chips 475 may be multi-level cell (MLC) or triple-level cell (TLC) NAND flash chips. In some implementations, the buffer NAND flash chips 470 can be of smaller capacity than the storage NAND flash chips 475. In some implementations, a group of buffer NAND flash chips 470 can have a capacity equal to the capacity of a single storage NAND flash chip 475. The group of buffer NAND flash chips 470 can be used collectively as a single buffer chip.

The write bandwidth of NAND flash storage devices can be limited due to the relatively slow pace of performing write operations. However, in some implementations, write bandwidth can be improved by designating more buffer NAND flash chips 470 as write buffers. In some implementations, and similar to the NAND flash storage device 250, the NAND flash storage device 450 can include additional buffer NAND flash chips 470; for example, buffer NAND flash chips 470c and 470d. In some implementations, the NAND flash storage device 450 can include even more buffer NAND flash chips 470. The controller 460 can thus spread write operations among the buffer NAND flash chips 470 to multiply the write bandwidth.

The NAND flash storage device 450 can potentially face two drawbacks. First, the buffer NAND flash chips 470 will eventually reach capacity. Once all data in a buffer NAND flash chip 470 has been copied to one of the storage NAND flash chips 475, all data in the buffer NAND flash chip 470 can be deleted. While the buffer NAND flash chip 470 performs erase operations, it cannot perform a write operation. Therefore, the write bandwidth will be limited by the unavailability of that buffer NAND flash chip 470.

The second potential drawback relates to the finite number of write operations that a NAND flash chip can handle before exhibiting excessive bit errors. NAND flash chips experience wear from processing write operations. Eventually, after performing many write operations, the NAND flash chip will wear out and begin to exhibit failures.

Figure 5:
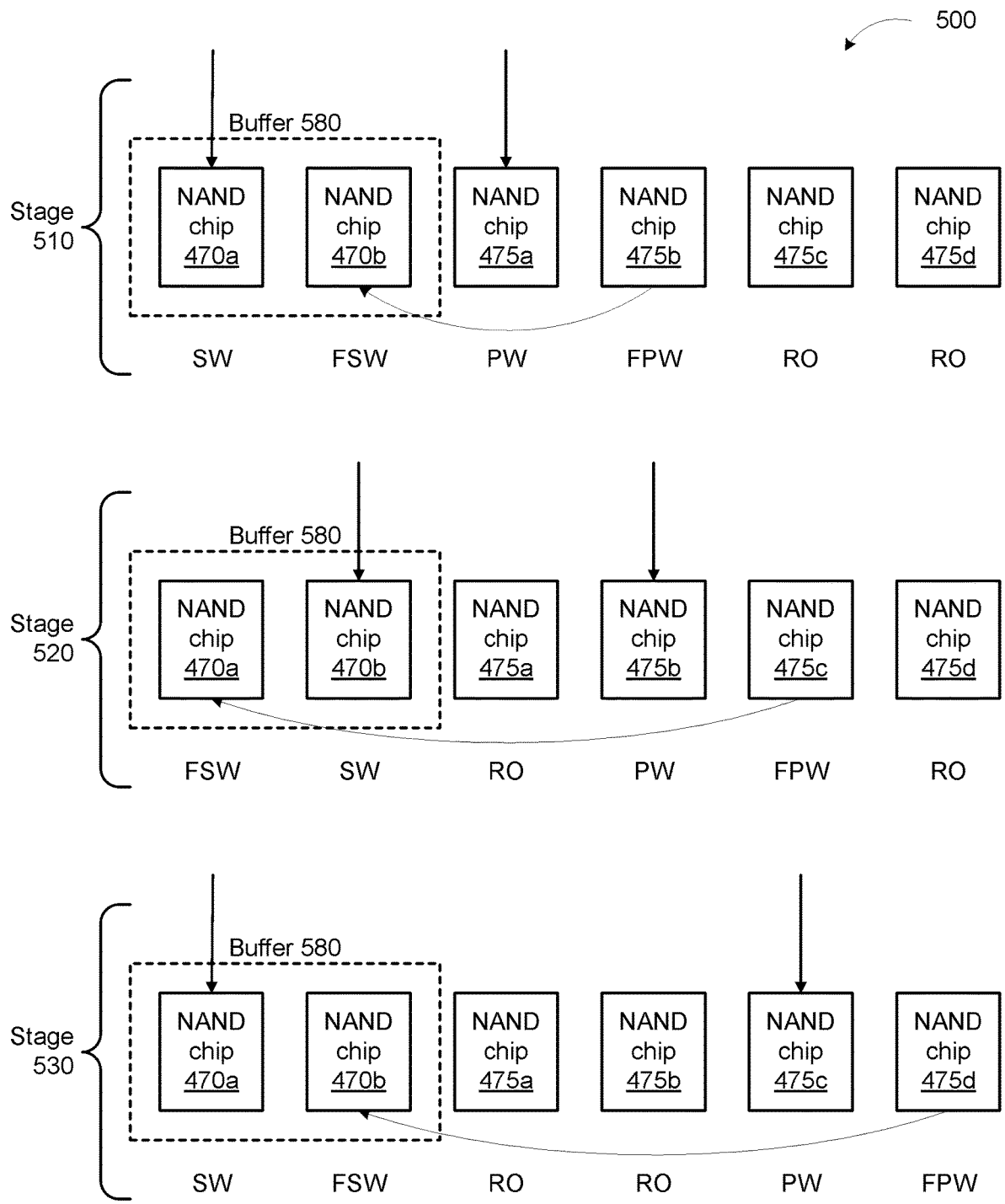
FIG. 5 shows example operations of a NAND flash storage device with a NAND buffer and additional NAND storage, according to an illustrative implementation.

In some implementations, the challenge of limited write bandwidth can be addressed by increasing the number of buffer NAND flash chips 470 as described above, and the NAND wear problem can be addressed by using higher endurance chips as buffer NAND flash chips 470. In some implementations, the NAND wear problem can be addressed by rotating the particular NAND flash chips designated as buffers for incoming data. Such a wear-leveling scheme is described further below with reference to FIGS. 7 through 9. FIG. 5 below illustrates example operations of the NAND flash storage device 450.

FIG. 5 shows example operations 500 of a NAND flash storage device with a NAND buffer and additional NAND storage, according to an illustrative implementation. These operations can be performed by a NAND flash storage device such as the NAND flash storage device 450 previously described. The operations 500 include stage 510, in which incoming data is written to the buffer NAND flash chip 470a and the storage NAND flash chip 475a, and data is copied with garbage collection from the storage NAND flash chip 475b to the buffer NAND flash chip 470b and subsequently copied back to the storage NAND flash chip 475b. The operations 500 include stage 520, in which incoming data is written to the buffer NAND flash chip 470b and the storage NAND flash chip 475b, and data is copied with garbage collection from the storage NAND flash chip 475c to the buffer NAND flash chip 470a and subsequently copied back to the storage NAND flash chip 475c. The operations 500 include stage 530, in which incoming data is written to the buffer NAND flash chip 470a and the storage NAND flash chip 475c, and the buffer NAND flash chip 470b receives data copied from the storage NAND flash chip 475d. The buffer NAND flash chips 470 are indicated by a buffer 580 box. The operation each NAND flash chip 470 or 475 is currently performing is indicated by an acronym. "PW" stands for "primary write" and indicates that the storage NAND flash chip 475 is currently designated for receiving data and performing write operations. "SW" stands for "secondary write" and indicates that the buffer NAND flash chip 470 is also currently designated for receiving data and performing write operations. "FPW" stands for "future primary write" and indicates that the NAND flash chip 475 is designated for being prepared for future service receiving data and performing write operations. "FSW" stands for "future secondary write" and indicates that the NAND flash chip 470 is designated for being prepared for future service receiving data and performing write operations. "RO" stands for "read-only" and indicates that the controller 460 will only call upon the RO storage NAND flash chips 475 to execute read operations. These labels are merely arbitrary, and are assigned only for the purpose of describing the operation of the various chips at particular points in time. Between each state of the operations 500, the role of each NAND flash chip 470 or 475 changes as different NAND flash chips 470 or 475 receive data and perform write operations.

During stage 510, the buffer NAND flash chip 470a and the storage NAND flash chip 475a receive and write incoming data, as indicated by the arrows. The buffer NAND flash chip 470a and the storage NAND flash chip 475a receive and write the same data, as the SW and the PW chips, respectively; however, they can perform the write operations during non-overlapping time periods. In this manner, both PW and the SW chips contain substantially the same data, and a NAND flash chip that is not performing a write operation can respond to a read command and perform the read operation promptly without having to wait for completion of the relatively long write operation. In some implementations, the PW and SW chips can continue receiving data and performing write operations until they are full or substantially full. Meanwhile, the FPW storage NAND flash chip 475b copies its data to the FSW buffer NAND flash chip 470b in preparation for receiving external data in the next stage 520. During the copy operation, the NAND flash storage device 450 can perform garbage collection on the FPW and the FSW chips. When fragmented data is copied from the FPW chip to the FSW chip, it is consolidated so that it is written to the FSW chip in a continuous or substantially continuous memory space, while free space is similarly consolidated in a second continuous or substantially continuous memory space. This makes the data representation more compact and leaves space at the end for new data to be written at the next stage 520. After all valid data is copied from the FPW chip to the FSW chip, the free space on the FPW is erased, and the valid data is copied back from the FSW chip to the FPW chip. When the PW and SW chips have completed their write operations and the FPW and the FSW chips have completed their copying and garbage collection, the operations 500 can continue with the next stage 520.

During stage 510 (and stages 520 and 530 as well) the NAND flash storage device 450 may from time to time receive a read request. The controller 460 may handle the read request in one of three ways depending on whether the requested data is on a RO chip, one of the PW or SW chips, or one of the FPW or FSW chips. If the requested data is on a RO chip, the controller 460 can simply execute the read operation on the RO chip and returns the data—there is no write operation occurring that would interfere with or delay execution of the read operation. If the requested data is on the PW or SW chip, the controller 460 can execute the read operation on whichever of the PW or SW chips is not currently executing a write operation such that read operations are not queued behind write operations. If the requested data is on the FPW or FSW chip, the controller 460 can execute the read operation on whichever of the FPW or FSW is not currently executing a write operation such that read operations are not queued behind write operations. That is, if data is currently being copied with garbage collection from the FPW chip to the FSW chip, the controller 460 will be executing write operations on the FSW chip, and so can execute the read operation on the FPW chip. When the data is being copied back from the FSW chip to the FPW chip, the controller 460 can execute the read operation on the FSW chip. In this manner, regardless of which NAND flash chip contains the requested data and which NAND flash chip[s] is/are executing write operations, the NAND flash device 450 can read and return the requested data without undue delay caused by queuing the read operation behind a write operation.

During stage 520, the storage NAND flash chip 475b is designated as the PW chip, the buffer NAND flash chip 470b is designated as the SW chip, the storage NAND flash chip 475c is designated as the FPW chip, the buffer NAND flash chip 470a is designated as the FSW chip, and the storage NAND flash chip 475a is designated RO. The functions of the PW, SW, FPW, and FSW chips are similar to functions performed by the chips with the same designations in the previous stage 510, but with different NAND flash chips performing each designated role. The SW and the PW chips receive and write the same data as indicated by the arrows; however, they can perform the write operations during non-overlapping time periods so that they can respond to a read command and perform the read operation promptly without having to wait for completion of the relatively long write operation. Meanwhile, the FPW chip copies its data to the FSW chip in preparation for receiving external data in the next stage 530. During the copy operation, the FPW and the FSW chips can perform garbage collection operations. When the PW and SW chips have completed their write operations and the FPW and the FSW chips have completed their copying and garbage collection, the operations 500 can continue with the next stage 530.

During stage 530, the storage NAND flash chip 475c is designated as the PW chip, the buffer NAND flash chip 470a is designated as the SW chip, the storage NAND flash chip 475d is designated as the FPW chip, the buffer NAND flash chip 470b is designated as the FSW chip, and the storage NAND flash chip 475b is designated RO. The functions of the PW, SW, FPW, and FSW chips are similar to functions performed by the chips with the same designations in the previous stages 510 and 520, but with different NAND flash chips performing each designated role. The SW and the PW chips receive and write the same data as indicated by the arrows; however, they can perform the write operations during non-overlapping time periods so that they can respond to a read command and perform the read operation promptly without having to wait for completion of the relatively long write operation. Meanwhile, the FPW chip copies its data to the FSW chip in preparation for receiving external data in the next stage. During the copy operation, the FPW and the FSW chips can perform garbage collection operations. When the PW and SW chips have completed their write operations and the FPW and the FSW chips have completed their copying and garbage collection, the operations 500 can continue with the next stage. The operations 500 can continue in this manner until all of the storage NAND flash chips 475 have been written to, at which time the operations 500 can repeat starting at the stage 510.

Figure 6:
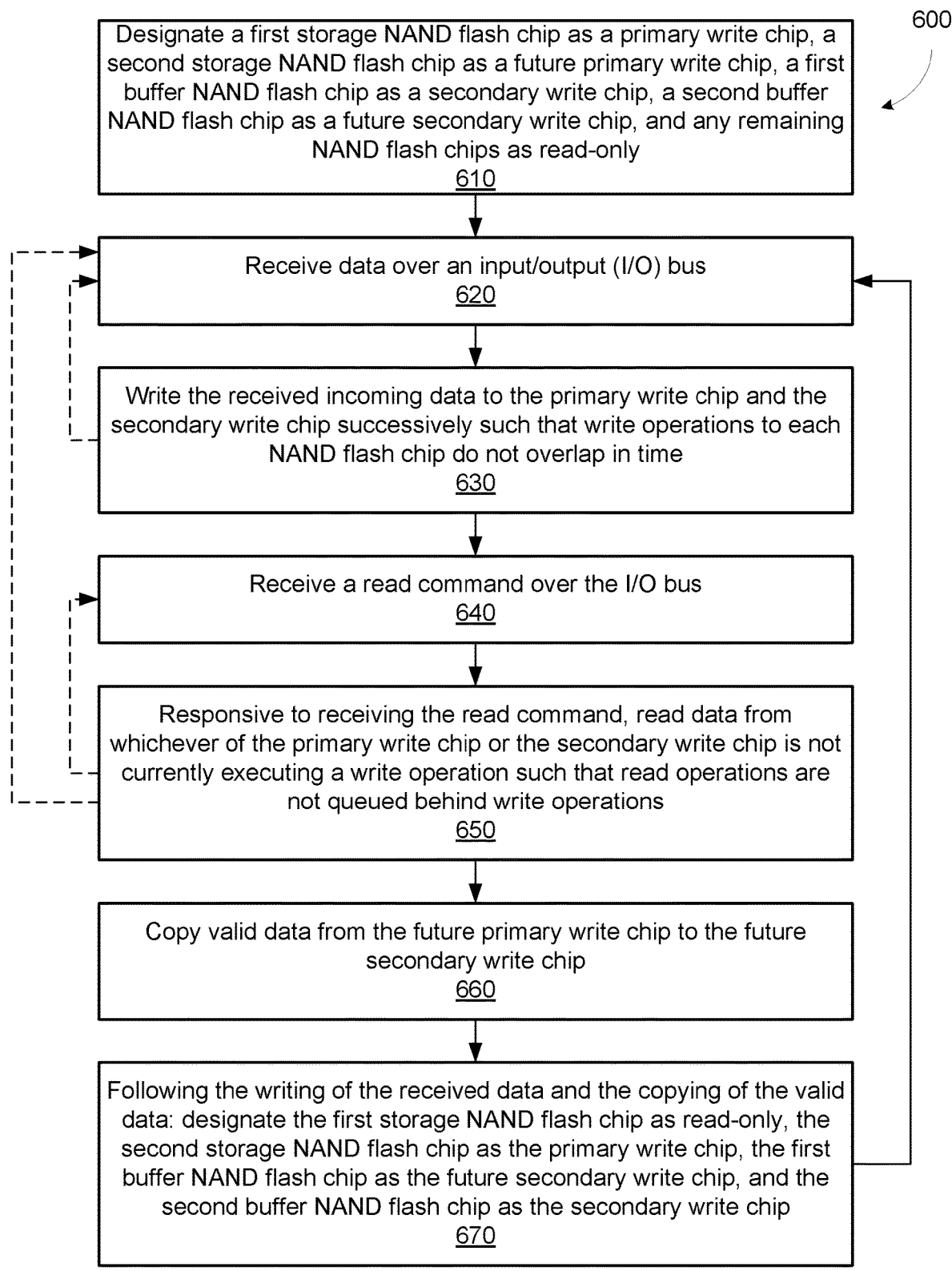
FIG. 6 is a flowchart showing an example method of using a NAND flash storage device with a NAND buffer and additional NAND storage, according to an illustrative implementation.

FIG. 6 is a flowchart showing an example method 600 of using a NAND flash storage device with a NAND buffer and additional NAND storage, according to illustrative implementations. The method 600 can provide for NAND flash storage space beyond the storage space provided by the buffer NAND chips. For example, the method 600 can be performed by the NAND flash storage device 450 previously described with reference to FIG. 4. The NAND flash storage device 450 can include buffer NAND flash chips 470 and storage NAND flash chips 475. The method 600 includes designating a first storage NAND flash chip as a primary write (PW) chip, a second storage NAND flash chip as a future primary write (FPW) chip, a first buffer NAND flash chip as a secondary write (SW) chip, a second buffer NAND flash chip as a future secondary write (FSW) chip, and any remaining NAND flash chips as read-only (RO). The method 600 includes receiving data over an input/output (I/O) bus (stage 620). The method 600 includes writing the received data to the PW chip and the SW chip successively such that the write operations to each NAND flash chip do not overlap in time (stage 630). The method 600 includes receiving a read command over the I/O bus (stage 640). The method 600 includes, responsive to receiving the read command, reading data from a NAND flash chip that is not currently executing a write operation such that read operations are not queued behind write operations (stage 650). The method 600 includes copying valid data from the FPW chip to the FSW chip (stage 660). The method 600 includes, following the writing of the received data and the copying of the valid data, designating the first storage NAND flash chip as RO, the second storage NAND flash chip as the PW chip, the first buffer NAND flash chip as the FSW chip, and the second buffer NAND flash chip as the SW chip (stage 670).

The method 600 includes designating a first storage NAND flash chip as a primary write chip, a second storage NAND flash chip as a future primary write chip, a first buffer NAND flash chip as a secondary write chip, a second buffer NAND flash chip as a future secondary write chip, and any remaining NAND flash chips as read-only (RO).

The method 600 includes receiving data over an I/O bus (stage 620). Stage 620 can be similar to stage 310 described previously.

The method 600 includes writing the received data to the PW chip and the SW chip successively such that the write operations to each NAND flash chip do not overlap in time (stage 630). Stage 630 can be similar to stage 320 described previously. In some implementations, the receiving stage 620 and the writing stage 630 can be repeated until the PW chip and the SW chip are full or substantially full.

The method 600 includes receiving a read command over the I/O bus (stage 640). Stage 630 can be similar to stage 430 described previously.

The method 600 includes, responsive to receiving the read command, reading data from a NAND flash chip that is not currently executing a write operation such that read operations are not queued behind write operations (stage 650). Stage 650 can be similar to stage 340 described previously. In practice, the requested data may reside on a RO chip, one of the PW or SW chips, or one of the FPW or FSW chips. The controller may handle the read request in one of three ways depending on where the requested data resides. If the requested data is on the PW or SW chip, the controller can execute the read operation on whichever of the PW or SW chips is not currently executing a write operation such that read operations are not queued behind write operations, and the method 600 can proceed to the next stage. If the requested data is on a RO chip, the controller can simply execute the read operation on the RO chip and returns the data—there is no write operation occurring that would interfere with or delay execution of the read operation. If the requested data is on the FPW or FSW chip, the controller can execute the read operation on whichever of the FPW or FSW is not currently executing a write operation such that read operations are not queued behind write operations. That is, if data is currently being copied with garbage collection from the FPW chip to the FSW chip, the controller 460 will be executing write operations on the FSW chip, and so can execute the read operation on the FPW chip. When the data is being copied back from the FSW chip to the FPW chip, the controller can execute the read operation on the FSW chip. In this manner, regardless of which NAND flash chip contains the requested data and which NAND flash chip[s] is/are executing write operations, the NAND flash device can read and return the requested data without undue delay caused by queuing the read operation behind a write operation. In this manner, stages 640 and 650 can proceed concurrently with stages 620 and 630, and read operations can be processed promptly without being queued behind slower write operations. The stages 620 through 650 can repeat as additional data and read commands are received over the I/O bus.

The method 600 includes copying valid data from the FPW chip to the FSW chip (stage 660). In some implementations, during the copy operation, the FPW and FSW chips can perform garbage collection to consolidate the valid data and the free space, respectively. For example, the NAND flash storage device can first copy the valid data from the FPW chip to the FSW chip such that the valid data and the free space, respectively, occupy substantially contiguous respective memory spaces of the FSW chip. The NAND flash storage device can copy the valid data from the FSW chip back to the FPW chip such that the valid data and the free space, respectively, occupy substantially contiguous respective memory spaces of the FPW chip. The NAND flash storage device can erase the memory spaces of the FPW and FSW chips occupied by the free space. The copying operations of stage 660 can be performed during an overlapping time period with the buffering operations of stages 620 and 630. In addition, read commands can be received and executed by whichever of the FPW and the FSW is not currently executing write operations as part of the copy operations. In this manner, the copying operations of stage 660 can also be performed during an overlapping time period with the read operations of stages 640 and 650.

The method 600 includes, following the writing of the received data and the copying of the valid data, designating the first storage NAND flash chip as RO, the second storage NAND flash chip as the PW chip, the first buffer NAND flash chip as the FSW chip, and the second buffer NAND flash chip as the SW chip (stage 670). The stages of the method 600 can repeat as additional data and read commands are received over the I/O bus. In some implementations, the role played by each particular NAND flash chip can cycle, with different NAND flash chips performing different buffer and storage functions at different times.

Figure 7:
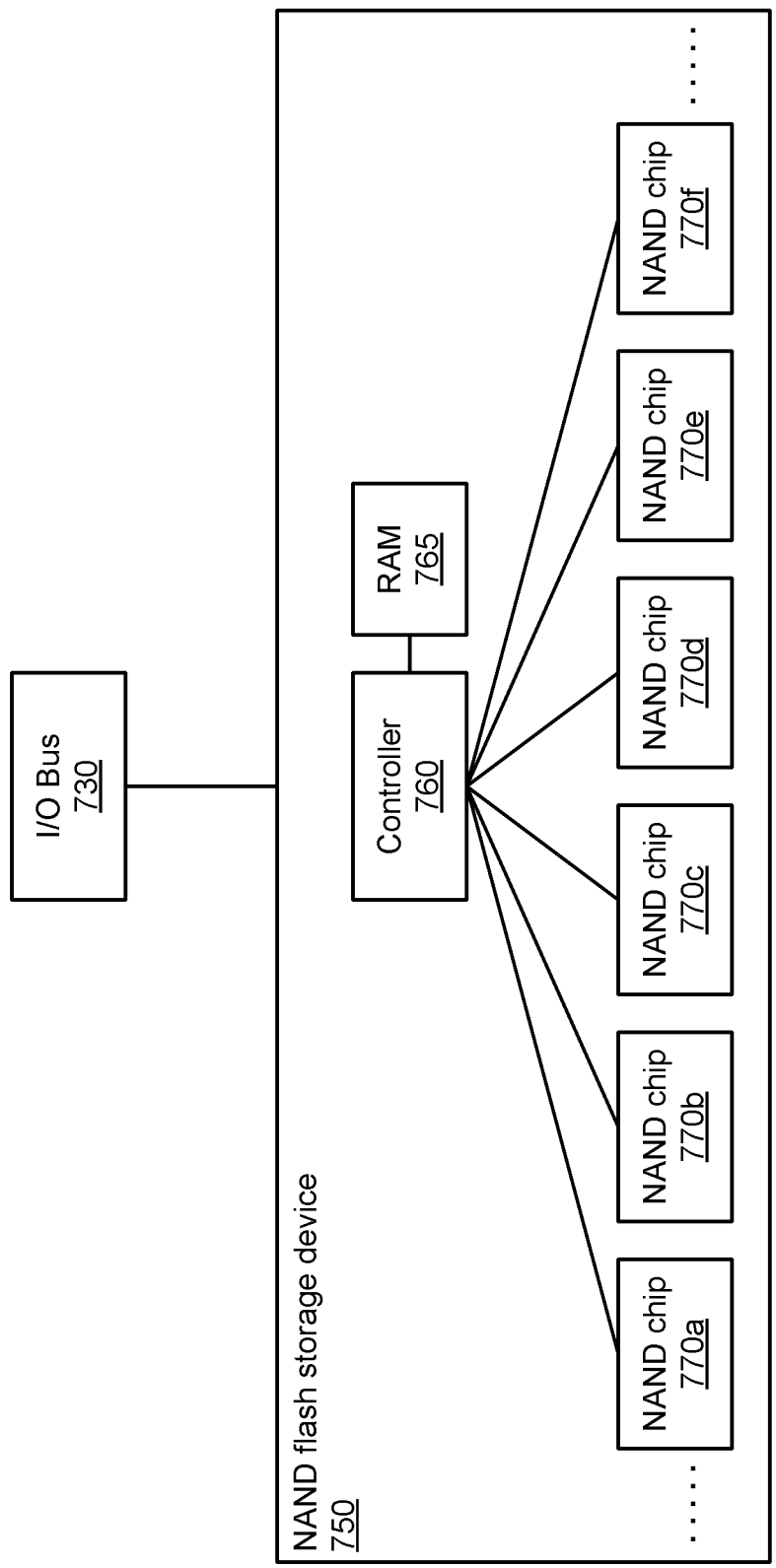
FIG. 7 is block diagram of an example NAND flash storage device with a rotating NAND buffer for wear leveling, according to an illustrative implementation.

FIG. 7 is block diagram of an example NAND flash storage device 750 with a rotating NAND buffer for wear leveling, according to illustrative implementations. The NAND flash storage device 750 includes a controller 760 for processing read and write commands received over the I/O bus 730. The controller 760 can include RAM 765, or be in communication with the RAM 765 via a memory bus. The controller 760 can include programmable logic such as an application-specific integrated circuit (ASIC), a field-programmable gate array (FPGA), a microcontroller, or a microprocessor. The controller 760 can be integral with, or external to the NAND flash storage device 750. The NAND flash storage device 750 includes NAND flash chips 770a to 770f (collectively, "NAND flash chips 770"). In some implementations, the NAND flash storage device 750 can include more or fewer NAND flash chips 770. In some implementations, the NAND flash storage device 750 can use the RAM 765 for buffering data received over the I/O bus 730 while it is being written to one or more of the NAND flash chips 770. The NAND flash storage device 750 can employ wear leveling by occasionally changing the NAND flash chips 770 used for buffering. For example, during a first stage of operation, NAND flash chips 770a and 770b can serve as the NAND buffers, with the controller 760 writing data to each one in turn. Example operations of the NAND flash storage device 750 are described in more detail below with reference to FIG. 8.

Figure 8:
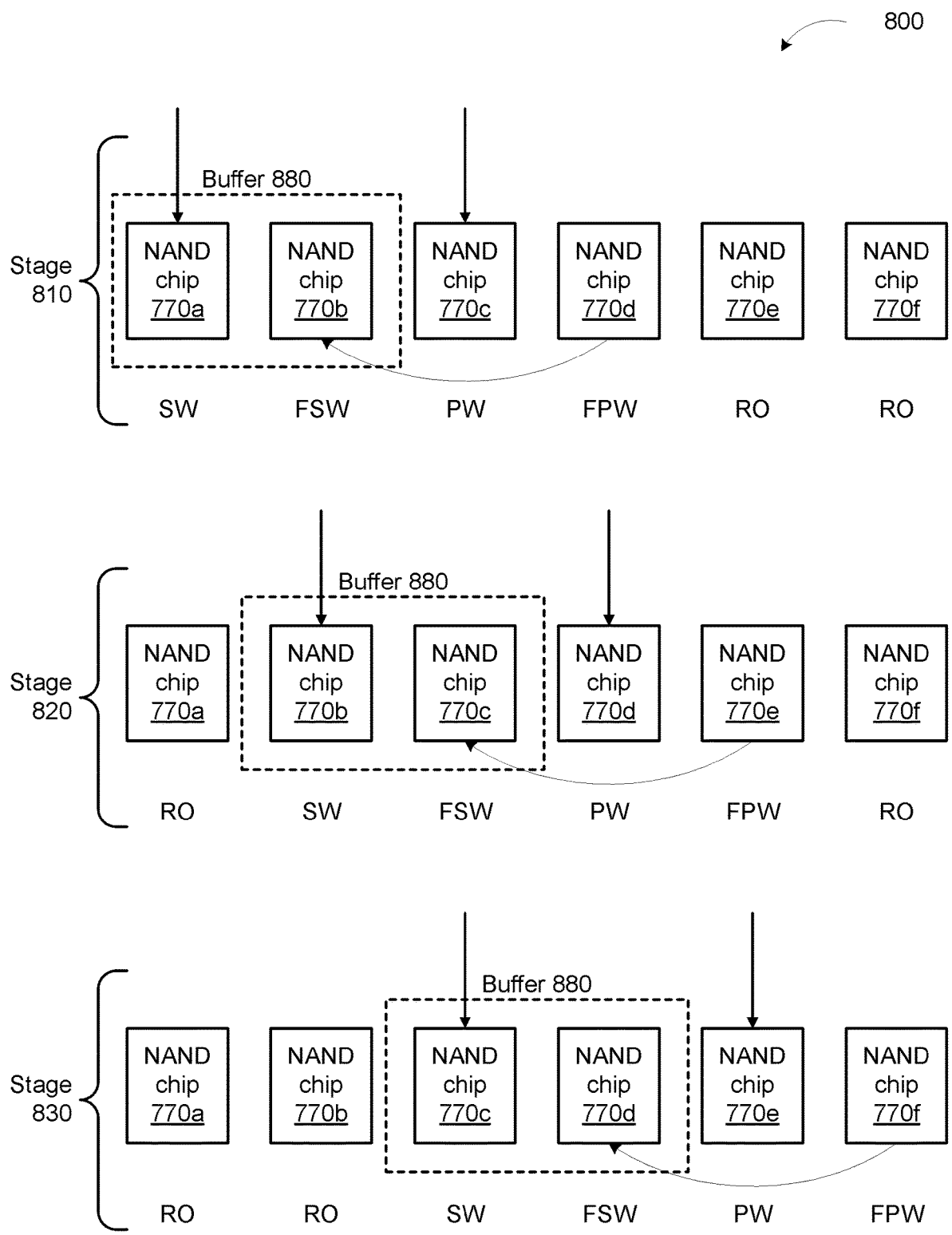
FIG. 8 shows example operations of a NAND flash storage device with a rotating NAND buffer for wear leveling, according to an illustrative implementation.

FIG. 8 shows example operations 800 of a NAND flash storage device with a rotating NAND buffer employing wear leveling, according to illustrative implementations. These operations can be performed by a NAND flash storage device such as the NAND flash storage device 750 previously described. The operations 800 include stage 810, in which incoming data is written to the NAND flash chips 770a and 770c, while data is copied with garbage collection from the NAND flash chip 770d to the NAND flash chip 770b and subsequently copied back to the NAND flash chip 770d. The operations 800 include stage 820, in which incoming data is written to the NAND flash chips 770b and 770d, while data is copied with garbage collection from the NAND flash chip 770e to the NAND flash chip 770c and subsequently copied back to the NAND flash chip 770e. The operations 800 include stage 830, in which incoming data is written to the NAND flash chips 770c and 770e, while data is copied with garbage collection from the NAND flash chip 770f to the NAND flash chip 770d and subsequently copied back to the NAND flash chip 770f. During each operation 800, the secondary write and the future secondary write NAND flash chips 770 are considered the buffer NAND flash chips, and are indicated by a buffer 880 box. The operation each NAND flash chip 770 is currently performing is indicated by an acronym. "PW" stands for "primary write" and indicates that the NAND flash chip 770 is currently receiving data and performing write operations. "SW" stands for "secondary write" and indicates that the NAND flash chip 770 is currently receiving data and performing write operations as one of the buffer NAND flash chips. "FPW" stands for "future primary write" and indicates that the NAND flash chip 770 is being prepared for future service as the primary write chip by copying its data to the future secondary write chip. "FSW" stands for "future secondary write" and indicates that the NAND flash chip 770 is receiving data from the FPW chip in preparation for future service as a SW buffer NAND flash chip. "RO" stands for "read-only" and indicates that the controller 760 will only call upon the RO NAND flash chip 770 to execute read operations. These labels are merely arbitrary, and are assigned only for the purpose of describing the function of the various chips during a given stage of operation 800. Between each stage of the operations 800, the role of each NAND flash chip 770 can change, as indicated by the labels below each chip and the buffer 880 box rotating through the available NAND flash chips 770.

During stage 810, the NAND flash chip 770a serves as the SW chip, the NAND flash chip 770b serves as the FSW chip, the NAND flash chip 770c serves as the PW chip, the NAND flash chip 770d serves as the FPW chip, and the remaining NAND flash chips serve as RO chips. Incoming data is written to the NAND flash chips 770a and 770c—the SW and PW chips, respectively. Meanwhile, data is copied with garbage collection from the NAND flash chip 770d to the NAND flash chip 770b—the FPW and FSW chips, respectively—and subsequently copied back to the NAND flash chip 770b. During stage 810, the buffer 880 includes the NAND flash chips 770a and 770b. The NAND flash chip 770b receives a copy of the data from the NAND flash chip 770d, so it may be at least partially unavailable for executing read operations, and may be affirmatively prevented by the controller 760 from executing read or write operations not associated with the copy operation. Garbage collection may be performed during the copy operation. This means that only valid data is copied and any gaps left by invalid data are removed in that process. This makes the data representation more compact and leaves space at the end for new data to be written at the next stage. In some implementations, this compacted form of data in NAND flash chip 770b may be copied back to NAND flash chip 770d. The NAND flash chips 770e and 770f, as well as any other NAND flash chips 770 not pictured, can serve as RO chips. At an appropriate time, the controller 760 can update the NAND flash chip 770 designations, and proceed to stage 820 of the operations 800. This can be when the buffer NAND flash chips 770a and 770c become full or substantially full, after a predetermined number of write operations have been performed, or following a predetermined interval of time.

During stage 810 (and stages 820 and 830 as well) the NAND flash storage device 750 may from time to time receive a read request. The controller 760 may handle the read request in one of three ways depending on whether the requested data is on a RO chip, one of the PW or SW chips, or one of the FPW or FSW chips. If the requested data is on a RO chip, the controller 760 can simply execute the read operation on the RO chip and returns the data—there is no write operation occurring that would interfere with or delay execution of the read operation. If the requested data is on the PW or SW chip, the controller 760 can execute the read operation on whichever of the PW or SW chips is not currently executing a write operation such that read operations are not queued behind write operations. If the requested data is on the FPW or FSW chip, the controller 760 can execute the read operation on whichever of the FPW or FSW is not currently executing a write operation such that read operations are not queued behind write operations. That is, if data is currently being copied with garbage collection from the FPW chip to the FSW chip, the controller 760 will be executing write operations on the FSW chip, and so can execute the read operation on the FPW chip. When the data is being copied back from the FSW chip to the FPW chip, the controller 760 can execute the read operation on the FSW chip. In this manner, regardless of which NAND flash chip contains the requested data and which NAND flash chip[s] is/are executing write operations, the NAND flash device 750 can read and return the requested data without undue delay caused by queuing the read operation behind a write operation.

During stage 820, the NAND flash chip 770b serves as the SW chip, the NAND flash chip 770c serves as the FSW chip, the NAND flash chip 770d serves as the PW chip, the NAND flash chip 770e serves as the FPW chip, and the remaining NAND flash chips serve as RO chips. Incoming data is written to the NAND flash chips 770b and 770d, and data is copied with garbage collection from the NAND flash chip 770e to the NAND flash chip 770c, and subsequently copied back to the NAND flash chip 770e. The NAND flash chip 770a is designated as an RO chip, and is available to execute read operations without interruption from write operations. The buffer 880 now includes the NAND flash chips 770b and 770c. Because the NAND flash chip 770c previously served as the PW chip, the data it contains will not be unique because the data had previously been written to the previous SW as well. Accordingly, the NAND flash chip 770c can receive duplicate data from the NAND flash chip 770e in preparation for being designated SW in the next stage of operation. During the copying operation, the NAND flash chips 770c and 770e can perform garbage collection operations.

During stage 830, the NAND flash chip 770c serves as the SW chip, the NAND flash chip 770d serves as the FSW chip, the NAND flash chip 770e serves as the PW chip, the NAND flash chip 770f serves as the FPW chip, and the remaining NAND flash chips serve as RO flash chips. Incoming data is written to the NAND flash chips 770c and 770e, while data is copied with garbage collection from the NAND flash chip 770f to the NAND flash chip 770d, and subsequently copied back to the NAND flash chip 770f. The NAND flash chip 770b is designated as an RO chip, and is available to execute read operations without interruptions from write operations. The buffer 880 now includes the NAND flash chips 770c and 770d. Because the NAND flash chip 770d previously served as the PW chip, the data it contains will not be unique because the data had previously been written to the previous SW as well. Accordingly, the NAND flash chip 770d can receive duplicate data from the NAND flash chip 770f in preparation for being designated SW in a subsequent stage of operation.

Additional stages can progress in this manner indefinitely to spread wear among some or all of the available NAND flash chips 770. In performing these operations, the NAND flash storage device 750 will write each received page of data to the NAND flash chips 770 twice, doubling the amount of wear inflicted; however, when the wear is spread evenly across many NAND flash chips 770, this amount of additional wear may be acceptable.

Figure 9:
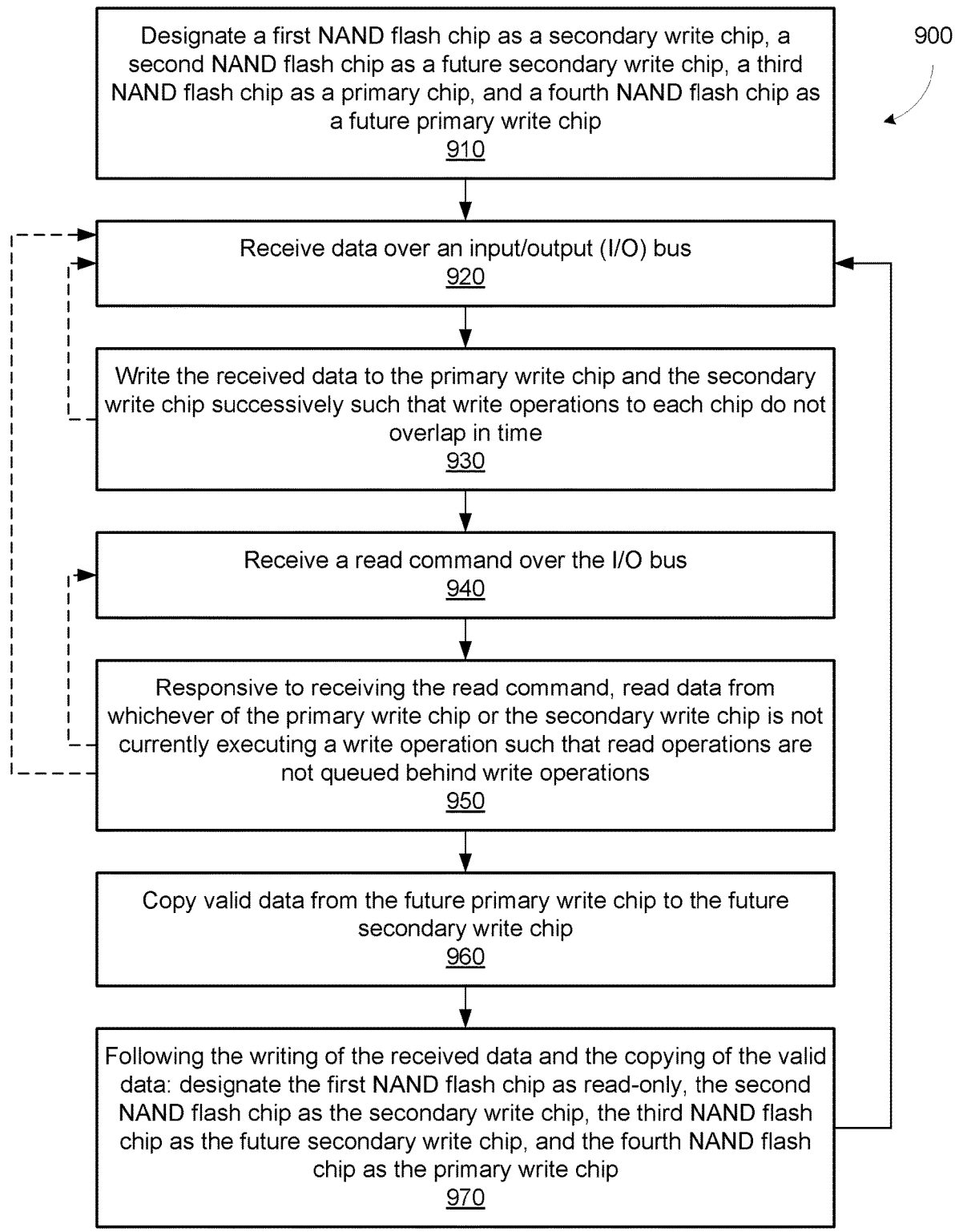
FIG. 9 is a flowchart showing an example method of using a NAND flash storage device with a rotating NAND buffer for wear leveling, according to an illustrative implementation.

FIG. 9 is a flowchart showing an example method 900 of using a NAND flash storage device with a rotating NAND buffer for wear leveling, according to illustrative implementations. For example, the method 900 can be performed by the NAND flash storage device 750 previously described with reference to FIG. 7. The method 900 can rotate through available NAND flash chips, designating each in turn as a buffer NAND chip, in order to distribute the wear caused by executing write operations and avoid failures potentially caused by focusing write operations on a small number of NAND flash chips. The method 900 includes designating a first NAND flash chip as a secondary write (SW) chip, a second NAND flash chip as a future secondary write (FSW) chip, a third NAND flash chip as a primary write (PW) chip, and a fourth NAND flash chip as a future primary write (FPW) chip (stage 910). The method 900 includes receiving data over an input/output (I/O) bus (stage 920). The method 900 includes writing the received data to the PW chip and the SW chip successively such that write operations to each chip do not overlap in time (stage 930). The method 900 includes receiving a read command over the I/O bus (stage 940). The method 900 includes, responsive to receiving the read command, reading data from a NAND flash chip that is not currently executing a write operation such that read operations are not queued behind write operations (stage 950). The method 900 includes copying valid data from the FPW chip to the FSW chip (stage 960). The method 900 includes, following the writing of the received data and the copying of the valid data: designating the first NAND flash chip as read-only, the second NAND flash chip as the SW chip, the third NAND flash chip as the FSW chip, and the fourth NAND flash chip as the PW chip (stage 970).

The method 900 includes designating the first NAND flash chip as the SW chip, the second NAND flash chip as the FSW chip, the third NAND flash chip as the PW chip, and the fourth NAND flash chip as the FPW chip (stage 910). The designations were described previously with reference to FIG. 8.

The method 900 includes receiving data over the I/O bus (stage 920). Stage 920 is similar to stages 310 and 610 described previously.

The method 900 includes writing the received data to the PW chip and the SW chip successively such that write operations to each chip do not overlap in time (stage 930). Stage 930 is similar to stages 320 and 620 described previously. In some implementations, the method 900 may continue performing receive operations of stage 920 and the write operations of stage 930 until the PW chip and the SW chip are full or substantially full before advancing to stage 950. The operations of stages 940 and 950, described below, can be performed concurrently with the operations of stages 920 and 930.

The method 900 includes receiving a read command over the I/O bus (stage 940). Stage 940 is similar to stages 330 and 640 described previously.

The method 900 includes, responsive to receiving the read command, reading data from a NAND flash chip that is not currently executing a write operation such that read operations are not queued behind write operations (stage 950). Stage 950 is similar to stages 340 and 650 previously described. In practice, the requested data may reside on a RO chip, one of the PW or SW chips, or one of the FPW or FSW chips. The controller may handle the read request in one of three ways depending on where the requested data resides. If the requested data is on the PW or SW chip, the controller can execute the read operation on whichever of the PW or SW chips is not currently executing a write operation such that read operations are not queued behind write operations, and the method 600 can proceed to the next stage. If the requested data is on a RO chip, the controller can simply execute the read operation on the RO chip and returns the data—there is no write operation occurring that would interfere with or delay execution of the read operation. If the requested data is on the FPW or FSW chip, the controller can execute the read operation on whichever of the FPW or FSW is not currently executing a write operation such that read operations are not queued behind write operations. That is, if data is currently being copied with garbage collection from the FPW chip to the FSW chip, the controller 460 will be executing write operations on the FSW chip, and so can execute the read operation on the FPW chip. When the data is being copied back from the FSW chip to the FPW chip, the controller can execute the read operation on the FSW chip. In this manner, regardless of which NAND flash chip contains the requested data and which NAND flash chip[s] is/are executing write operations, the NAND flash device can read and return the requested data without undue delay caused by queuing the read operation behind a write operation. In this manner, stages 940 and 950 can proceed concurrently with stages 920 and 930, and read operations can be processed promptly without being queued behind slower write operations. The stages 920 through 950 can repeat as additional data and read commands are received over the I/O bus.

The method 900 includes copying valid data from the FPW chip to the FSW chip (stage 960). To prepare two new NAND flash chips to serves as buffer NAND chips in a later stage, the method 900 can copy data from one NAND flash chip to another NAND flash chip. The copy source can be designated the FPW chip and the copy destination can be designated the FSW chip. In some implementations, the copy operation can be bidirectional; that is, data can be harmonized between the FPW chip and the FSW chip such that they each contain a duplicate of the other's data. During the copying operation, the FSW chip and the FPW chip can perform garbage collection operations to consolidate data and free space of data that is invalid or no longer needed. The copying operations of stage 960 can be performed during an overlapping time period with the buffering operations of stages 920 and 930. In addition, read commands can be received and executed by whichever of the FPW and the FSW is not currently executing write operations as part of the copy operations. In this manner, the copying operations of stage 960 can also be performed during an overlapping time period with the read operations of stages 940 and 950.

The method 900 includes, following the writing of the received data and the copying of the valid data: designating the first NAND flash chip as a read-only chip, the second NAND flash chip as the SW chip, the third NAND flash chip as the FSW chip, and the fourth NAND flash chip as the PW chip (stage 970). Once the FPW chip and the FSW chip contain duplicate data, they will be ready to take over as the PW chip and the SW chip, respectively. As long as the copying operations can be performed while the buffer NAND flash chips are still handling write operations, the NAND flash storage device 770 can switch designations without delay and continue executing write operations without a significant loss in write bandwidth.

In some implementations, the rotation can continue. For example, the controller 760 can designate a fifth NAND flash chip 770e as the FPW chip. The controller 760 can write second data received over the I/O bus 730 to the PW chip and the SW chip such that write operations to each chip do not overlap in time. The controller 760 can copy second valid date from the FPW chip to the FSW chip. And, following the writing of the second received data and the copying of the second valid data, the controller 760 can designate the second NAND flash chip as read-only, the third NAND flash chip as the SW chip, the fourth NAND flash chip as the FSW chip, the fifth NAND flash chip as the PW chip, and a sixth NAND flash chip as the FPW chip.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A NAND flash storage device comprising:
a plurality of NAND flash chips, including a first NAND flash chip, a second NAND flash chip, a third NAND flash chip, and a fourth NAND flash chip; and
a controller configured to:
designate the first NAND flash chip as a secondary write chip, the second NAND flash chip as a future secondary write chip, the third NAND flash chip as a primary write chip, the fourth NAND flash chip as a future primary write chip, and any remaining NAND flash chips as read-only NAND flash chips;
receive data over an input/output (I/O) bus;
write the received data to the primary write chip and the secondary write chip successively such that write operations to each chip do not overlap in time;
receive a read command over the I/O bus;
responsive to receiving the read command, read data from whichever of the first NAND flash chip or the second NAND flash chip is not currently executing a write operation such that read operations are not queued behind write operations;
copy valid data from the future primary write chip to the future secondary write chip; and
following the writing of the received data and the copying of the valid data, designate the first NAND flash chip as read-only, the second NAND flash chip as the secondary write chip, the third NAND flash chip as the future secondary write chip, and the fourth NAND flash chip as the primary write chip.

2. The NAND flash storage device of claim 1, wherein the controller is configured to:
following the writing of the received data and the copying of the valid data:
designate a fifth NAND flash chip as the future primary write chip;
write second data received over the I/O bus to the primary write chip and the secondary write chip successively such that write operations to each chip do not overlap in time;
copy second valid data from the future primary write chip to the future secondary write chip; and
following the writing of the received second data and the copying of the second valid data:
designate the second NAND flash chip as read-only, the third NAND flash chip as the secondary write chip, the fourth NAND flash chip as the future secondary write chip, and the fifth NAND flash chip as the primary write chip.

3. The NAND flash storage device of claim 1, wherein the copy operation includes:
copying the valid data from the future primary write chip to the future secondary write chip such that the valid data and the free space, respectively, occupy substantially contiguous respective memory spaces of the future secondary write chip;
copying the valid data from the future secondary write chip back to the future primary write chip such that the valid data and the free space, respectively, occupy substantially contiguous respective memory spaces of the future primary write chip; and
erasing the memory spaces of the future primary write chip and the future secondary write chip occupied by the free space.

4. The NAND flash storage device of claim 1, wherein:
the write operation and the copy operation are performed during overlapping time periods.

5. A NAND flash storage device comprising:
a plurality of buffer NAND flash chips, including a first buffer NAND flash chip and a second buffer NAND flash chip;
a plurality of storage NAND flash chips, including a first storage NAND flash chip and a second storage NAND flash chip; and
a controller configured to:
designate the first storage NAND flash chip as a primary write chip, the second storage NAND flash chip as a future primary write chip, the first buffer NAND flash chip as a secondary write chip, the second buffer NAND flash chip as a future secondary write chip, and any remaining NAND flash chips as read-only;
receive incoming data over an input/output (I/O) bus;
write the received data to the primary write chip and the secondary write chip successively such that write operations to each chip do not overlap in time;
receive a read command over the I/O bus;
responsive to receiving the read command, read data from whichever of the first buffer NAND flash chip or the first storage NAND flash chip is not currently executing a write operation such that read operations are not queued behind write operations;
copy valid data from the future primary write chip to the future secondary write chip; and following the writing of the received data and the copying of the valid data, designate the first storage NAND flash chip as read-only, the second storage NAND flash chip as the primary write chip, the first buffer NAND flash chip as the future secondary write chip, and the second buffer NAND flash chip as the secondary write chip.

6. The NAND flash storage device of claim 5, wherein the controller is configured to:
following the writing of the received data and the copying of the valid data:
designate a third storage NAND flash chip as the future primary write chip;
write second data received over the I/O bus to the primary write chip and the secondary write chip successively such that write operations to each chip do not overlap in time;
copy second valid data from the future primary write chip to the future secondary write chip; and
following the writing of the received second data and the copying of the second valid data, designate the second storage NAND flash chip as read-only, the third storage NAND flash chip as the primary write chip, the first buffer NAND flash chip as the secondary write chip, and the second buffer NAND flash chip as the future secondary write chip.

7. The NAND flash storage device of claim 5, wherein the copy operation includes:
copying the valid data from the future primary write chip to the future secondary write chip such that the valid data and the free space, respectively, occupy substantially contiguous respective memory spaces of the future secondary write chip;
copying the valid data from the future secondary write chip back to the future primary write chip such that the valid data and the free space, respectively, occupy substantially contiguous respective memory spaces of the future primary write chip; and
erasing the memory spaces of the future primary write chip and the future secondary write chip occupied by the free space.

8. The NAND flash storage device of claim 5, wherein:
the plurality of buffer NAND flash chips are single-level cell (SLC) NAND flash chips; and
the plurality of storage NAND flash chips are triple-level cell (TLC) NAND flash chips.

9. A method of buffering a NAND flash storage device comprising:
designating a first NAND flash chip as a secondary write chip, a second NAND flash chip as a future secondary write chip, a third NAND flash chip as a primary write chip, a fourth NAND flash chip as a future primary write chip, and any remaining NAND flash chips as read-only;
receiving data over an input/output (I/O) bus;
writing the received data to the primary write chip and the secondary write chip successively such that write operations to each chip do not overlap in time;
receiving a read command over the I/O bus;
responsive to receiving the read command, reading data from whichever of the first NAND flash chip or the second NAND flash chip is not currently executing a write operation such that read operations are not queued behind write operations;
copying valid data from the future primary write chip to the future secondary write chip; and following the writing of the received data and the copying of the valid data: designating the first NAND flash chip as read-only, the second NAND flash chip as the secondary write chip, the third NAND flash chip as the future secondary write chip, and the fourth NAND flash chip as the primary write chip.

10. The method of claim 9, comprising:
following the writing of the received data and the copying of the valid data:
designating a fifth NAND flash chip as the future primary write chip;
writing second data received over the I/O bus to the primary write chip and the secondary write chip successively such that write operations to each chip do not overlap in time;
copying second valid data from the future primary write chip to the future secondary write chip; and
following the writing of the received second data and the copying of the second valid data, designating the second NAND flash chip as read-only, the third NAND flash chip as the secondary write chip, the third NAND flash chip as the further secondary write chip, the fourth NAND flash chip as the primary write chip, and the fifth NAND flash chip as the future primary write chip.

11. The method of claim 9, wherein the copy operation includes:
copying the valid data from the future primary write chip to the future secondary write chip such that the valid data and the free space, respectively, occupy substantially contiguous respective memory spaces of the future secondary write chip;
copying the valid data from the future secondary write chip back to the future primary write chip such that the valid data and the free space, respectively, occupy substantially contiguous respective memory spaces of the future primary write chip; and
erasing the memory spaces of the future primary write chip and the future secondary write chip occupied by the free space.

12. The method of claim 9, wherein:
the writing operation and the copying operation are performed during overlapping time periods.

13. A method of buffering a NAND flash storage device comprising:
designating a first storage NAND flash chip as a primary write chip, a second storage NAND flash chip as a future primary write chip, a first buffer NAND flash chip as a secondary write chip, a second buffer NAND flash chip as a future secondary write chip, and any remaining NAND flash chips as read-only;
receiving data over an input/output (I/O) bus;
writing the received data to the primary write chip and the secondary write chip successively such that write operations to each chip do not overlap in time;
receiving a read command over the I/O bus;
responsive to receiving the read command, reading data from whichever of the first buffer NAND flash chip or the first storage NAND flash chip is not currently executing a write operation such that read operations are not queued behind write operations;
copying valid data from the future primary write chip to the future secondary write chip; and
following the writing of the received data and the copying of the valid data: designating the first storage NAND flash chip as read-only, the second storage NAND flash chip as the primary write chip, the first buffer NAND flash chip as the future secondary write chip, and the second buffer NAND flash chip as the secondary write chip.

14. The method of claim 13, comprising:
following the writing of the received data and the copying of the valid data:
  designating a third storage NAND flash chip as the future primary write chip;
  writing second data received over the I/O bus to the primary write chip and the secondary write chip successively such that write operations to each chip do not overlap in time;
  copying second valid data from the future primary write chip to the future secondary write chip; and
  following the writing of the received second received data and the copying of the second valid data, designating the second storage NAND flash chip as read-only, the third storage NAND flash chip as the primary write chip, the first buffer NAND flash chip as the secondary write chip, and the second buffer NAND flash chip as the future secondary write chip.

15. The method claim 14, wherein the copy operation includes:
  copying the valid data from the future primary write chip to the future secondary write chip such that the valid data and the free space, respectively, occupy substantially contiguous respective memory spaces of the future secondary write chip;
  copying the valid data from the future secondary write chip back to the future primary write chip such that the valid data and the free space, respectively, occupy substantially contiguous respective memory spaces of the future primary write chip; and
  erasing the memory spaces of the future primary write chip and the future secondary write chip occupied by the free space.

16. The method of claim 13, wherein:
the plurality of buffer NAND flash chips are single-level cell (SLC) NAND flash chips; and
the plurality of storage NAND flash chips are triple-level cell (TLC) NAND flash chips.

* * * * *